United States Patent
Brombach

(10) Patent No.: US 11,527,890 B2
(45) Date of Patent: Dec. 13, 2022

(54) METHOD FOR FEEDING ELECTRICAL POWER INTO AN ELECTRICAL SUPPLY NETWORK

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/045,424

(22) PCT Filed: Apr. 2, 2019

(86) PCT No.: PCT/EP2019/058254
§ 371 (c)(1),
(2) Date: Oct. 5, 2020

(87) PCT Pub. No.: WO2019/192993
PCT Pub. Date: Oct. 10, 2019

(65) Prior Publication Data
US 2021/0151985 A1 May 20, 2021

(30) Foreign Application Priority Data

Apr. 5, 2018 (DE) ...................... 10 2018 108 023.9

(51) Int. Cl.
*H02J 3/16* (2006.01)
*H02J 3/46* (2006.01)
(Continued)

(52) U.S. Cl.
CPC ................ *H02J 3/16* (2013.01); *H02J 3/381* (2013.01); *H02J 3/46* (2013.01); *H02J 3/48* (2013.01);
(Continued)

(58) Field of Classification Search
CPC .. H02J 3/16; H02J 3/1878; H02J 3/381; H02J 3/48; H02J 3/50; H02J 2300/02; H02J 3/46; Y02E 10/76; Y02E 40/03
See application file for complete search history.

(56) References Cited

U.S. PATENT DOCUMENTS 8,203,318 B2    6/2012  Fortmann
2011/0133461 A1* 6/2011  Hjort ........................ H02J 3/381
                                                                290/44
(Continued)

FOREIGN PATENT DOCUMENTS

DE      102012212366 A1    1/2014
EP           2202862 A1    6/2010
WO   WO-2006054932 A1 *   5/2006   ............ H02J 3/1807

*Primary Examiner* — Toan T Vu
*Assistant Examiner* — Thai H Tran
(74) *Attorney, Agent, or Firm* — Seed IP Law Group LLP

(57) ABSTRACT

A method for feeding electric power into an electrical supply grid by means of a local feed unit. The feed unit is connected to a grid link point connected to a transformer point directly or via a supply connection. The transformer point is connected to a grid section via a transformer. The method includes feeding electrical real power into the electrical supply grid at the grid link point, feeding electrical reactive power into the electrical supply grid at the grid link point, detecting a change to be made in the real power to be fed in, and changing the fed-in real power in accordance with the detected change to be made. The method includes limiting a change in the fed-in reactive power over time when changing the fed-in real power and/or immediately thereafter or temporarily activating voltage control on the basis of the change in the fed-in real power.

18 Claims, 8 Drawing Sheets

(51) Int. Cl.
*H02J 3/50* (2006.01)
*H02J 3/38* (2006.01)
*H02J 3/48* (2006.01)
*H02J 3/18* (2006.01)

(52) U.S. Cl.
CPC .............. *H02J 3/50* (2013.01); *H02J 3/1878* (2013.01); *H02J 2300/28* (2020.01)

(56) References Cited

U.S. PATENT DOCUMENTS

2013/0168963 A1   7/2013  Garcia
2014/0375053 A1  12/2014  Nielsen
2015/0137520 A1   5/2015  Garcia
2015/0198145 A1*  7/2015  Diedrichs ................. H02J 3/24
                                                         290/44

* cited by examiner

METHOD FOR FEEDING ELECTRICAL POWER INTO AN ELECTRICAL SUPPLY NETWORK

BACKGROUND

Technical Field

The present invention relates to a method for feeding electric power into an electrical supply grid by means of a local feed unit, in particular by means of at least one wind power installation or a wind farm. Furthermore, the present invention relates to a corresponding wind power installation that can carry out such a method, and the invention also relates to a wind farm having multiple wind power installations, wherein the wind farm can carry out such a method. In particular, the present invention also relates to a wind farm that can perform such a method for providing a feed by means of its wind power installations.

Description of the Related Art

Wind power installations, wind farms or other local feed units today are not only able to feed into the electrical supply grid during parallel grid operation but can also contribute to controlling and stabilizing the electrical supply grid. A basic situation covered thereby is that, in the event of an excess supply of power, such local feed units need to reduce their fed-in power in response to an applicable demand, which can come from the grid operator, for example. Particularly wind power installations, wind farms or other local feed units that provide a feed by means of an inverter or inverter technology can reduce their power very quickly, namely within a few seconds, e.g., 5 seconds or less.

Such a fast control response or such a fast control capability can be very advantageous for controlling the electrical supply grid, but undesirable effects can also occur. A frequent occurrence, for example, is that such a local feed unit uses an at least temporarily stipulated cos(q) that is less than 1 to provide a feed. Reactive power is thus also fed in. The local feed unit thus feeds in the desired power by feeding in an appropriate current, the current having an applicable non-0 phase angle with reference to the phase of the grid voltage, that is to say the voltage in the electrical supply grid. This reactive current or the corresponding reactive power is needed in order to set a voltage level. A need in this regard arises particularly when there are long supply connections between a grid link point to which a feed is provided and a transformer that transforms the voltage to a higher voltage level. Alternatively, configurations in which the fed-in reactive power or the fed-in reactive current influences the voltage level are within the bounds of possibility.

If the power reduction described is now made, the current fed in is thus reduced. If the phase angle is unchanged, the cos(q) thus also remains unchanged and hence the reactive power likewise decreases as a result of the decrease in the fed-in current. This in turn can lead to an undesirable voltage change both at the grid link point but particularly also at the transformer, namely in particular at a substation, although this ideally should not be the case, because the cos(q) should be set such that it compensates for a voltage drop over a line. Such ever suitable compensation assumes a linear system, however, and usually has an optimum effect at one point at best.

In principle, voltage changes, particularly at the substation, can be compensated for by means of an appropriate variable ratio transformer. The variable ratio transformer then changes the effective winding ratio of the primary side to the secondary side, or vice versa, particularly by mechanically changing an applicable tap, and thus changes its response. A voltage change can therefore be compensated for by appropriately adjusting the variable ratio transformer. Known variable ratio transformers are not usually capable of compensating for such a fast voltage change as can be achieved by means of the fast change in the fed-in power by means of the local feed unit, however. In the short term, the absence of reactive power thus produces a voltage increase on the primary side that cannot be corrected immediately and hence can appear particularly as a voltage spike in the electrical supply grid.

To counter this, it is known practice to artificially slow down the control response of such local feed units. The desired power reduction is frequently known early on, because it provides for the operation of a wind power installation to be cut down, for example in order to reduce noise at a certain time of day. Thus, if the operation of a wind power installation needs to be cut down at 8 o'clock in the evening for noise reduction reasons, for example, this can be started in advance at five minutes before 8 or ten minutes before 8 by virtue of the power then being slowly reduced at this earlier time by means of an appropriate ramp, so that the power has then actually reached the reduced value at 8 o'clock in the evening. Such a measure leads to a loss of yield, however, because a power reduction is performed earlier than necessary.

The German Patent and Trademark Office performed a search for the following prior art in the priority application for the present PCT application: DE 10 2012 212 366 A1; US 2013/0168963 A1 and US 2014/0375053 A1.

BRIEF SUMMARY

Provided are techniques that allow for a power reduction with as few yield losses as possible to be performed on local feed units.

A method is provided. This method relates to the feeding of electric power into an electrical supply grid by means of a local feed unit. The local feed unit may in particular be a wind power installation or multiple wind power installations; in particular, it can form a wind farm having multiple wind power installations. The feed unit is connected to a grid link point for the purpose of feeding in the electric power. The grid link point is in turn connected to a transformer point via a supply connection, namely for the purpose of transmitting the electric power from the grid link point to the transformer via the supply connection. The transformer point is in turn connected to a grid section via a transformer, for the purpose of transmitting the electric power from the transformer point to the grid section via the transformer. Accordingly, this topology thus comprises the feed unit, the grid link point, the supply connection and the transformer, which is finally connected to a grid section.

Assuming this topology, electrical real power is fed into the electrical supply grid at the grid link point. Additionally, electrical reactive power is fed into the electrical supply grid at the grid link point. Furthermore, a change to be made in the real power to be fed in is detected. For example it is thus detected if the real power is intended to be increased or decreased soon or at a specific time. The fed-in real power is changed accordingly.

In this regard, it is now proposed to limit a change in the fed-in reactive power over time when changing the fed-in real power and additionally or alternatively immediately thereafter. This is proposed in order to counteract a voltage increase at the transformer point and/or in the grid section.

A change in the fed-in reactive power over time is thus specifically proposed here, and this can particularly mean stipulating a ramp, that is to say a gradient, or a limit gradient, which defines the maximum speed at which the reactive power is changed. There is no provision for such a restriction for the real power, however. The real power can thus be reduced immediately at the time at which it needs to be reduced. It does not need to be reduced beforehand. For limiting the change in the fed-in reactive power over time, this is also proposed for this time or beginning at this time or beginning immediately thereafter.

Similarly, this can also be proposed for a real power increase. At the time at which the real power is intended to be increased or particularly at which it can be increased, it is then also increased to the new value immediately, and therefore as much real power as is possible and permitted can be fed in immediately. This avoids raising the real power in a manner slowed down with a ramp from the same time, because this would again result in yield losses.

Additionally, this also allows comparatively fast and also simple implementation, because this variant requires no preplanning particularly for the real power reduction.

The proposed limiting is preferably performed only temporarily, namely only for the event of decreasing the feed of real power.

The method for limiting the reactive power gradient is particularly advantageous if the wind farm is connected to the substation directly and is under cos(q) feedback control. It has particularly been recognized in this case that different ratios of resistance to reactance can be expected between sections in the electrical supply grid, on the one hand, and sections in a transformer, on the other hand. This means that it is problematic to keep voltages constant in both sections. Allowance is also made here for cos(q) possibly being well-suited to voltage control for lines, whereas voltage-dependent reactive power control (Q(U)) at the transformer, that is to say particularly at a substation, and in the electrical supply grid are frequently better suited. It has also been recognized that allowance must be made for there being no provision for voltage-dependent reactive power control in some arrangements, or for such control being implementable only in a sophisticated manner. It may then be necessary to perform voltage control using cos(φ). Alternatively, instead of limiting the change in the fed-in reactive power over time, temporary activation of voltage control on the basis of the change in the fed-in real power is proposed. This temporary activation is preferably provided for a period of less than 10 minutes. This temporary voltage control thus involves voltage control at a reference point, in particular at the grid link point, being performed during and/or immediately after the change in the fed-in real power, in order to dynamically correct the voltage at the reference point or grid link point, and/or to take it along a trajectory, in particular along a ramp. Whether control is effected to produce a voltage at the grid link point or at another reference point, such as for example the transformer point, may also be dependent on a stipulation by the grid operator.

According to this variant, voltage control is therefore proposed in which the voltage can be controlled particularly by means of a reactive power adjustment. Controlling a voltage by adjusting a reactive power is known fundamentally, but the proposal in this case is to apply such control only temporarily. This voltage control is proposed only for the brief event of the reduction of real power. In particular, there can otherwise be cos(φ) feedback control, which is suspended for the event of the real power being changed.

In particular, the temporarily activated voltage control is active only during the change in the fed-in real power and/or immediately thereafter. The voltage control thus involves the voltage at the grid link point being reduced from a value that is changed by the change in the fed-in real power wholly or partially to a value that the voltage at the grid link point had immediately before the change in the fed-in real power. The proposal in this case is therefore particularly to reduce the voltage to the old value. This is intended to take place dynamically, in order to avoid signal peaks. By way of example, an oscillation-free behavior of a second-order delay element can be stipulated therefor. The behavior concerning how the voltage is intended to be managed, namely particularly reduced, is preferably firmly stipulated by a trajectory. A voltage characteristic is therefore firmly stipulated and the behavior can be controlled thereby. Signal peaks are avoided as a result.

The temporarily activated voltage control is preferably performed in particular when the grid link point is connected to a transformer point directly, that is to say when there is no supply connection or the supply connection has no or no significant influence on the reactive power voltage behavior. In this regard, it has particularly been recognized that there is no influence by a supply connection and therefore direct voltage control to the reference point can be advantageous.

The change in the fed-in reactive power over time is preferably limited such that the fed-in reactive power is changed in accordance with a change function, in particular in accordance with a ramp having a slope of limited absolute value. A ramp for changing the reactive power is therefore stipulated and a reactive power step change is thereby avoided. The steepness of this ramp and hence the speed of the change in the reactive power is preferably stipulated as a limit here, so that said limit is not exceeded at any rate. A shallower slope is within the bounds of possibility, however.

Additionally or alternatively, limiting is effected such that a gradient limit value is stipulated for the fed-in reactive power, said gradient limit value stipulating a maximum change in the absolute value of the fed-in reactive power over time, in particular such that the fed-in reactive power is changed with a temporal gradient whose absolute value does not exceed the gradient limit value. This also means that such a gradient limit value stipulates a maximum speed of change that cannot be exceeded. A gentler change is permitted, however. As a result, the change in the reactive power is basically freely selectable, but is limited with regard to excessively large changes over time.

According to one embodiment, it is proposed that the transformer has a primary side, to which the transformer point is connected, that the transformer has a secondary side, to which the grid section is connected, and that the transformer is in the form of a variable ratio transformer and can adjust a transformation ratio of the primary side to the secondary side, so as thereby to control a voltage level at the transformer point. A variable ratio transformer of this kind is therefore assumed for this embodiment, and in this regard it is proposed that the change in the fed-in reactive power over time is limited such that a voltage change at the transformer point, or on the primary side, that results from the change in the fed-in reactive power is so slow that the variable ratio transformer can correct it.

It has particularly been recognized here that the reactive power can also influence the voltage level on the primary side of the transformer. Although a variable ratio transformer used there can correct a voltage change so that a voltage change on the primary side thus does not lead, or leads in a reduced manner, to a corresponding voltage change on the secondary side, it can achieve this only comparatively slowly.

The practice of matching the limiting of the change in the fed-in reactive power over time to the dynamic range of the variable ratio transformer has therefore been recognized. Particularly an appropriately shallow ramp for controlling the change in the reactive power means that it is accordingly possible to cause the voltage on the primary side of the variable ratio transformer to also change only correspondingly slowly. It is fundamentally proposed that there be provision for the change in the fed-in reactive power over time to be limited only if a change to be made in the real power to be fed in has been detected, that is to say if there are desired gradients for the real power or the reactive power. There is thus only temporary provision for the limiting, which is not intended to limit all changes.

There is preferably provision here for a ramp function to be stipulated for changing the reactive power, said ramp function stipulating a change from a reactive power initial value to a reactive power final value and, for that purpose, providing for a duration of at least one minute, in particular of at least two minutes and preferably of at least five minutes. This significantly limits the speed at which the reactive power is changed and fundamentally matches it to a dynamic range of the variable ratio transformer. It should be borne in mind that the reactive power, if not limited as proposed, can be changed by a feed unit, which uses an inverter, in a few seconds or even more quickly. A slowing by a multiple in comparison with the technical possibilities of an inverter is thus proposed.

In particular, it is proposed that despite limiting the change in the fed-in reactive power over time there is no provision for limiting a change in the fed-in real power over time. It is thus expressly proposed that different dynamic ranges be provided for the real power and the reactive power, namely a very slow dynamic range for the reactive power and a fast or unlimited dynamic range for the real power. The change in the real power is then only technically contingent on the local feed unit and in particular on its inverter. Even the power taken from the wind in a wind power installation can be changed within a few seconds in modern pitch-controlled wind power installations, however. Such a speed for changing the real power is also intended to be permitted here, while the change in the reactive power over time is limited, namely in particular is very greatly limited in comparison with the cited speed at which the real power is changed.

According to one embodiment, it is proposed that voltage control at the grid link point or at another point in the grid, in particular the secondary side of the transformer, be performed during the change in the fed-in real power and/or immediately thereafter, in order to correct the voltage at this point, which can therefore also be referred to as a control point, to a value, or to take it along a trajectory, in particular along a ramp.

It is therefore proposed in particular that the change in the reactive power be temporarily incorporated into a control loop. This control loop detects the voltage at the grid link point or another point or control point in the grid, which could also take place indirectly using a measurement filter or state observer but preferably takes place directly by means of a measurement, and reduces this voltage detected in this way at the grid link point for the control. In particular, a setpoint/actual value comparison is then performed, which involves a setpoint voltage value being compared with an actual voltage value, namely with the detected voltage, and this control error is then used as input variable for the reactive power control. The reactive power is thus adjusted on the basis of such a voltage divergence. This can also be used to control the voltage along a trajectory, specifically by virtue of a voltage characteristic instead of a constant voltage value being stipulated as voltage setpoint value, and the described comparison with the detected voltage, that is to say with the actual voltage, then being performed with said voltage setpoint value.

In particular, taking the voltage along a trajectory in this manner allows a desired voltage characteristic to be stipulated, and this can also be effected such that the voltage characteristic leads to a voltage change not only at the grid connection point but also on the primary side of the transformer, that is to say at the transformer point, which the variable ratio transformer can correct. This thus avoids excessively large voltage changes as a result of selective control.

According to one embodiment, there is provision for power factor control, which can also be referred to as cos(φ) feedback control, for the feeding-in of electrical reactive power. Such power factor control involves the fed-in reactive power being adjusted on the basis of the fed-in real power such that a stipulated power factor, which is also referred to as cos(φ) or cos φ, is obtained. In this instance, the change in the fed-in real power involves the fed-in reactive power initially being changed as well concurrently such that the power factor remains unchanged. However, a new value for the power factor is then stipulated on the basis of a voltage at the grid link point that changes as a result of the change in the real power and reactive power. The new value for the power factor can alternatively be stipulated on the basis of a changing voltage that is to be expected at the grid link point as a result of the change in the real power and reactive power. In other words, changing the real power and reactive power leads to the voltage being changed. This can be counteracted by changing the power factor. This can either be accomplished such that the directly resulting voltage change is converted into a changed power factor as promptly as possible, so as thereby to counteract the voltage, or this voltage change can be anticipated in advance.

On the basis of the topology or earlier measurements, it may be well known how the voltage at the grid link point will change as a reaction to the change in the real power and reactive power. Insofar as such a change in the voltage is not desired, this can be counteracted by appropriately changing the power factor, particularly such that the power factor is changed right at the start of the change in the real power, so that the reactive power simply does not change such that an undesirably large voltage change occurs at the grid link point or another point or control point in the grid.

At any rate the result in both cases will be a changed power factor, namely changed in comparison with the initial situation described. It is now proposed that this changed power factor be reduced to the earlier power factor again, namely to the power factor stipulated then and still. The power factor was thus changed only temporarily in order to counteract the change in the voltage at the grid link point, or another point or control point in the grid. The power factor is thus reduced again, the reduction being made with a delay and additionally or alternatively using a time function.

The proposal here too is thus to reduce the power factor not using a step change function, which can also be referred to as a step function, but rather gradually. This can be accomplished by means of different delays, such as for example also using a PT1 response, to mention just one variant. It can alternatively be reduced using an appropriate time function, and a simple time function is an applicable ramp that starts at the temporarily changed power factor and ends at the previous, that is to say stipulated, power factor. Instead of a ramp, however, other functions are also within the bounds of possibility, but these should where possible have no or at most small steps.

The basis here is therefore a solution for a standard feed using power factor control. Such power factor control fundamentally provides for a fixed power factor to be observed and for changes of real power to result in the reactive power always accordingly being changed as well on the basis of this power factor. It is proposed that this control concept be left as unchanged as possible, but that the power factor be changed temporarily in the event of the described critical case of the undesirably large change in the voltage at the grid link point. Thus, only the power factor change described needs to be made, whereas the power factor control implemented overall can remain.

According to one embodiment, it is proposed that
there is provision for power factor control ($\cos(\varphi)$ feedback control) for the feeding-in of electrical reactive power, said power factor control involving the fed-in reactive power being adjusted on the basis of the fed-in real power such that a stipulated power factor ($\cos(\varphi)$) is obtained, wherein
the change in the fed-in real power involves the latter being changed along a ramp or trajectory. This change is made in particular in a time of less than one minute, in particular in the range from 10 seconds to 40 seconds.

In this regard, it is also proposed that
the change in the fed-in real power along the ramp or trajectory involves voltage control being used in order to keep the voltage at the reference point constant, at least in order to counteract a voltage change as a result of the change in the fed-in real power, wherein the voltage control accomplishes this by adjusting the reactive power, and the power factor control ($\cos(\varphi)$ feedback control) is deactivated during this voltage control,
the change in the fed-in real power is followed by a reactive power value that results from the voltage control being taken to a new reactive power value that would be obtained as a result of the deactivated power factor control ($\cos(\varphi)$ feedback control), wherein
the reactive power value is taken to the new reactive power value in particular via a ramp and/or trajectory. There is preferably provision for a period of from 2 minutes to 10 minutes, in particular a period of from 3 to 7 minutes, for reducing it in this way. The deactivated power factor control ($\cos(\varphi)$ feedback control) is then subsequently activated again, namely as soon as the reactive power value has reached the new reactive power value.

Accordingly, the assumption here too is initially a regular feed with feed-in of real power (E) and adjustment of reactive power (Q) in accordance with a selected power factor $\cos(\varphi)$. A real power ramp with temporarily activated voltage control is then effected. At the end, this results in a changed Q value, which is chosen, or is obtained as a result of the voltage control, such that the voltage is substantially held at the old value as far as possible.

The difference between a reactive power setpoint value (Q setpoint value) in accordance with the power factor control ($\cos(\varphi)$ feedback control) and the present reactive power value (Q value) in accordance with the voltage control is then ascertained. The reactive power value (Q value) is then slowly ramped up to the value in accordance with the power factor control ($\cos(\varphi)$ feedback control). This is performed such that only a continuous change in the voltage is obtained. A tap changer, that is to say a variable transformer, can then react to this continuous voltage change.

It is preferably proposed that the fed-in real power be changed using a real power step change, although the reactive power is by contrast changed using a time function, in particular using a ramp function. The particular effect achieved thereby is that a change of real power can be made as quickly as possible in order to avoid power losses. Undesirable voltage step changes or otherwise undesirable voltage changes, particularly at the grid link point or at another point in the electrical supply grid, can be avoided by means of the non-abrupt adjustment of the reactive power, however. The choice of the point at which undesirable voltage step changes or otherwise undesirable voltage changes are avoided may be dependent on a grid operator, for example as a result of the latter stipulating them.

The limiting of the change in the fed-in reactive power is preferably dependent on the type and/or size of the supply connection. It has particularly been recognized here that the supply connection, that is to say particularly a line between the grid link point and the transformer point, that is to say the transformer, can end up having very different impedances. There may be topologies having high and low impedances; however, it is particularly also possible for the reactance, that is to say the reactive component of the impedance, to end up very different. Depending on the type of line, the reactance, that is to say the reactive component, may be of similar magnitude to the resistance, that is to say the real component, of the impedance, or greater than the resistance by a multiple. This particularly affects reactive-power-dependent voltages, or how changes of reactive power change the voltage. Allowance is preferably made for this when limiting the change in the fed-in reactive power over time.

A wind power installation for feeding electric power into an electrical supply grid is also proposed, wherein
the wind power installation is connected to a grid link point for the purpose of feeding in the electric power,
the grid link point is connected to a transformer point via a supply connection, for the purpose of transmitting the electric power from the grid link point to the transformer point via the supply connection, and
the transformer point is connected to a grid section via a transformer, for the purpose of transmitting the electric power from the transformer point to the grid section via the transformer, and the wind power installation comprises:
an inverter for feeding electrical real power into the electrical supply grid at the grid link point;
an inverter controller for controlling a feed of electrical reactive power into the electrical supply grid at the grid link point; and
an input interface for detecting a change to be made in the real power to be fed in, wherein
the inverter controller is prepared to change the fed-in real power in accordance with the detected change to be made, and wherein
the inverter controller is prepared to limit a change in the fed-in reactive power over time when changing the fed-in real power and/or immediately thereafter, in order to counteract a voltage increase at the transformer point and/or in the grid section, and/or the inverter controller is prepared to temporarily activate voltage control on the basis of the change in the fed-in real power, in order to perform voltage control at a reference point, in particular at the grid link point, during and/or immediately after the change in the fed-in real power, in order to dynamically correct the voltage at the reference point or grid link point, and/or to take it along a trajectory, in particular along a ramp.

In particular, the feeding-in is performed by means of an inverter, which receives its power from a generator. The inverter can be actuated by means of the inverter controller, and this can also be used to control further method steps. In particular, such an inverter controller can control the change in the fed-in real power in accordance with the detected change to be made, and it can also limit the change in the fed-in reactive power over time. In particular, the inverter controller can implement respective applicable control/feedback control algorithms for this purpose and generate resultant setpoint values for the real power, reactive power and/or the power factor or phase angle. These setpoint values can then be implemented by the inverter accordingly. This can also involve a setpoint value being stipulated for a current that is to be fed in.

The wind power installation is preferably prepared to perform a method according to at least one of the embodiments described above. To this end, appropriate algorithms may be implemented in the inverter controller or another control unit; there is preferably provision for at least one voltage sensor, in order to detect a voltage at the grid link point or another point in the grid.

Moreover, a wind farm comprising multiple wind power installations is proposed, said wind farm comprising at least one wind power installation and/or being able to carry out at least one method according to one of the embodiments described above that relate to a method for providing a feed. To this end, the applicable method may be implemented in a central control unit of the wind farm or is carried out by the wind power installation individually in each case.

A feed arrangement for feeding electric power into an electrical supply grid is also proposed, comprising:
 a local feed unit, in particular a wind power installation;
 a grid link point; and
 a transformer having a transformer point, wherein
 the feed unit is connected to the grid link point for the purpose of feeding in the electric power,
 the grid link point is connected to the transformer point directly or via the supply connection, for the purpose of transmitting the electric power from the grid link point to the transformer point via the supply connection, and
 the transformer point is connected to a grid section via the transformer, for the purpose of transmitting the electric power from the transformer point to the grid section via the transformer, and the feed arrangement comprises:
 an inverter for feeding electrical real power into the electrical supply grid at the grid link point;
 an inverter controller for controlling a feed of electrical reactive power into the electrical supply grid at the grid link point; and
 an input interface for detecting a change to be made in the real power to be fed in, wherein
 the inverter controller is prepared to change the fed-in real power in accordance with the detected change to be made, and wherein
 the inverter controller is prepared to limit a change in the fed-in reactive power over time when changing the fed-in real power and/or immediately thereafter, in order to counteract a voltage increase at the transformer point and/or in the grid section, and/or
 the inverter controller is prepared to temporarily activate voltage control on the basis of the change in the fed-in real power, in order to perform voltage control at a reference point, in particular at the grid link point, during and/or immediately after the change in the fed-in real power, in order to dynamically correct the voltage at the reference point or grid link point, and/or to take it along a trajectory, in particular along a ramp.

The feed arrangement therefore has at least one local feed unit, in particular a wind power installation, and additionally also a grid link point, a supply connection and a transformer having a transformer point. Otherwise, its configuration and mode of operation are obtained in accordance with the embodiments described above.

The feed arrangement therefore preferably has a wind power installation according to at least one embodiment of a wind power installation as described above. Additionally or alternatively it has a wind farm according to at least one embodiment of a wind farm as described above. Additionally or alternatively the feed arrangement is prepared to carry out a method according to at least one embodiment of a method as described above.

The effect and the advantages are obtained accordingly from the respective explanations of the respective embodiments, mutatis mutandis.

BRIEF DESCRIPTION OF THE SEVERAL VIEWS OF THE DRAWINGS

The invention is described in more detail by way of example below on the basis of embodiments with reference to the accompanying figures.

DETAILED DESCRIPTION

Figure 1:
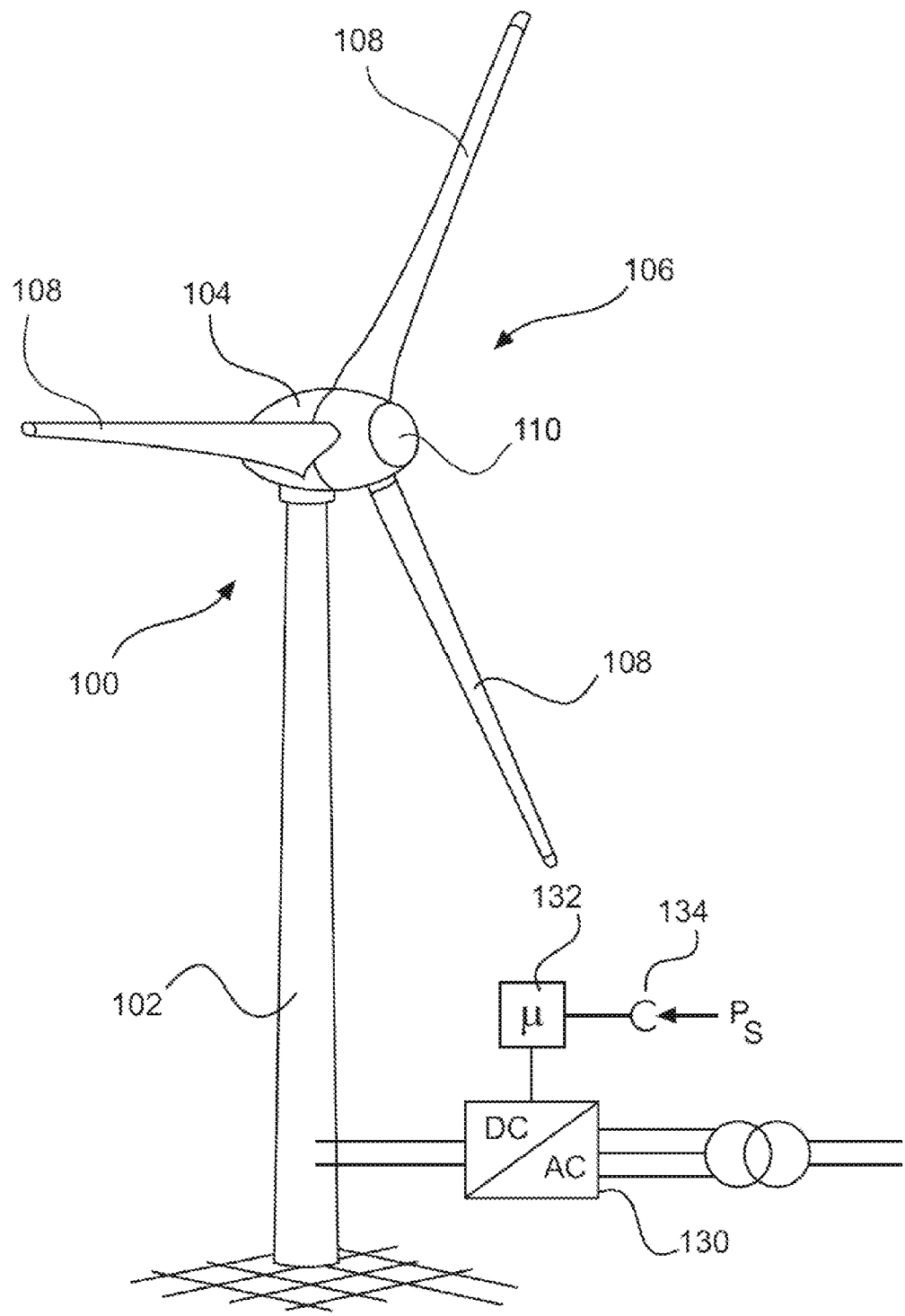
FIG. 1 shows a perspective depiction of a wind power installation.

FIG. 1 shows a wind power installation 100 having a tower 102 and a nacelle 104. The nacelle 104 has a rotor 106 arranged on it, having three rotor blades 108 and a spinner 110. The rotor 106 is set in a rotary motion by the wind during operation and thereby drives a generator in the nacelle 104. To provide a feed, there is provision for an inverter 130 that can be controlled by means of an inverter controller 132. The inverter controller is moreover provided with an input interface 134 via which setpoint values, particularly a real power setpoint value Ps, can be input.

Figure 2:
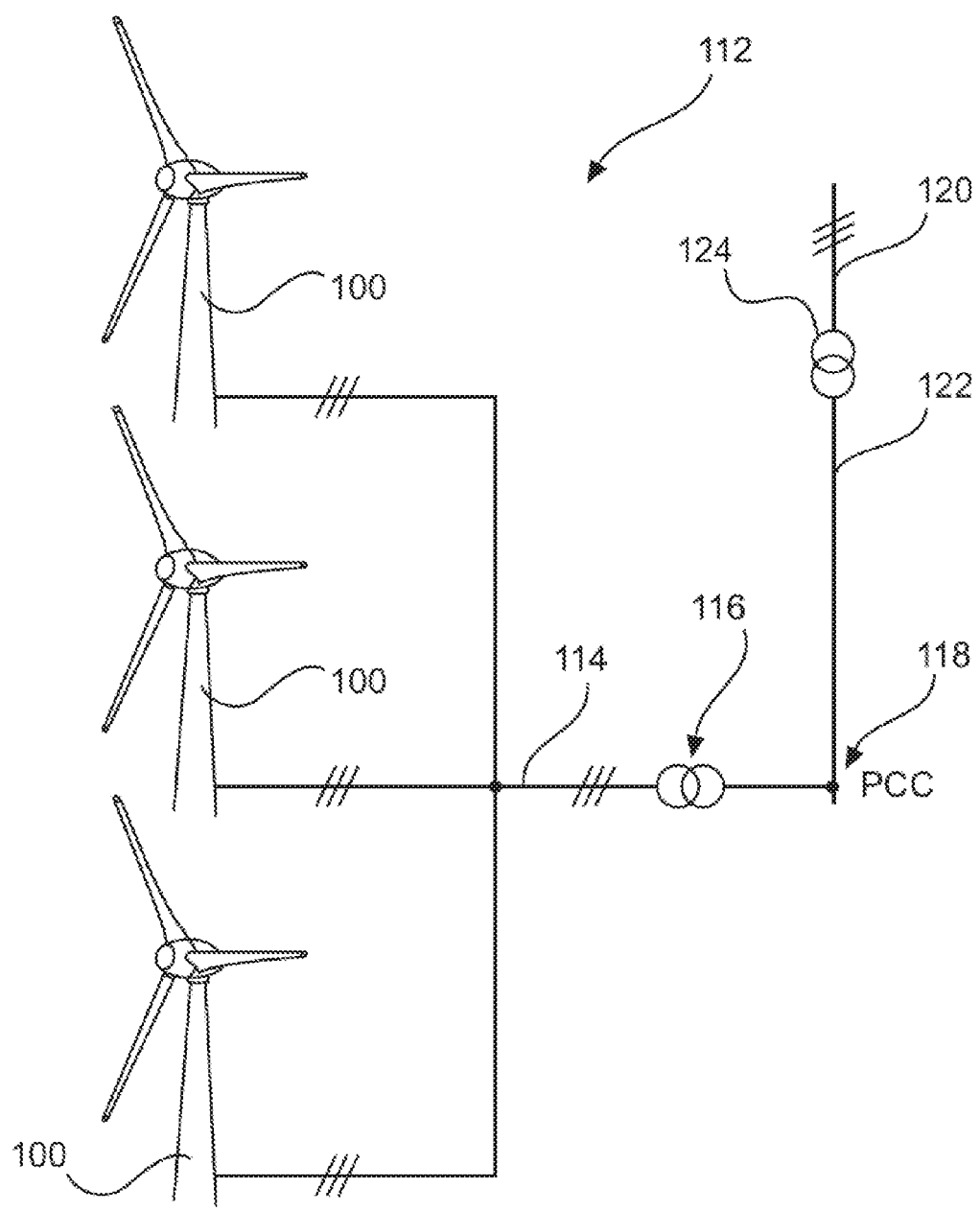
FIG. 2 shows a schematic depiction of a wind farm.

FIG. 2 shows a wind farm 112 having, in exemplary fashion, three wind power installations 100, which may be identical or different. The three wind power installations 100 are therefore representative of basically any number of wind power installations on a wind farm 112. The wind power installations 100 provide their power, namely in particular the generated current, via an electrical farm grid 114. The respective currents or powers generated by each of the individual wind power installations 100 are added and there is usually provision for a transformer 116 that steps up the voltage on the farm, so as then to feed into the supply grid 120 at the feed point 118, which is also referred to generally as a PCC. There is also provision for a variable ratio transformer 124, which is connected to the feed point 118, which can also be referred to as a grid link point, via a supply connection 122. The variable ratio transformer 124 is also used to step up the voltage further to the voltage in the supply grid 120. The wind power installations 100 may be in a form as shown in FIG. 1, including inverter 130 and inverter controller 132 with input interface 134. There may alternatively be provision for a central controller for the farm 112.

FIG. 2 is just a simplified depiction of a wind farm 112 that does not show a controller, for example, even though a controller is naturally present. The farm grid 114 may for example also be in a different form, for example by virtue of there also being a transformer at the output of each wind power installation 100, to mention just one other exemplary embodiment.

Figure 3:
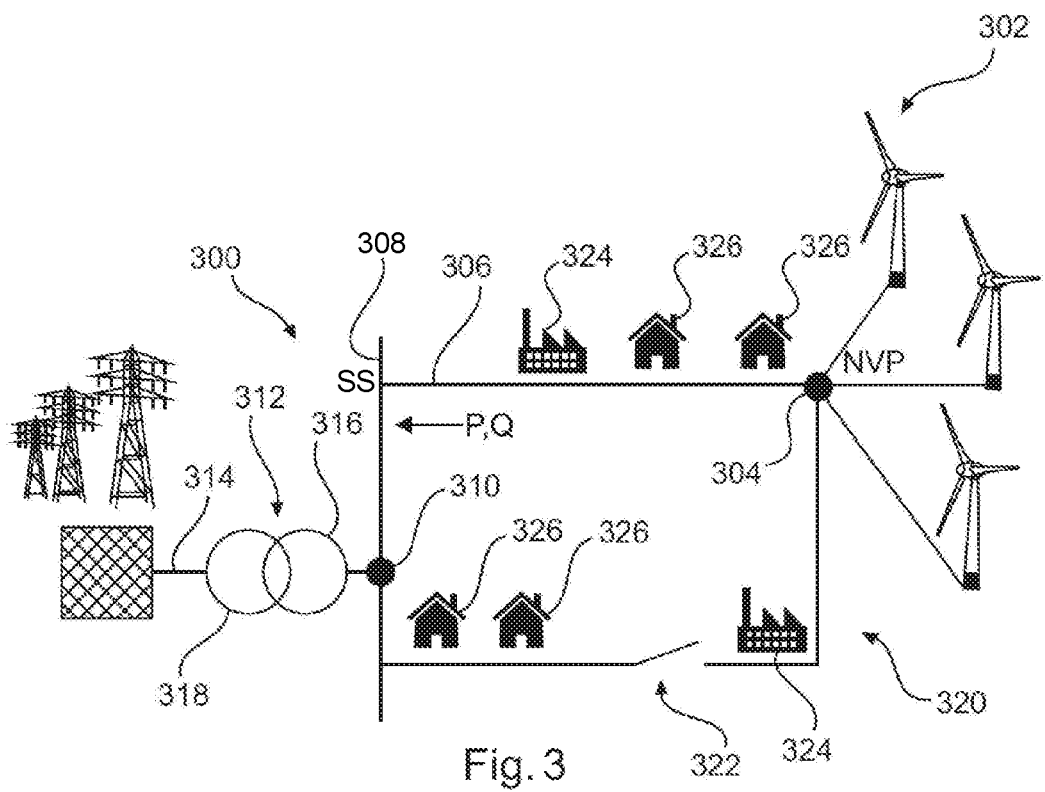
FIG. 3 shows a schematic depiction of a feed arrangement.

The feed arrangement 300 in FIG. 3 has a wind farm 302 as local feed unit. This wind farm 302 is connected to a grid link point 304 and connected to a transformer point 310 by means of a connecting cable 306, which in this instance forms a supply connection, via a busbar 308. The busbar 308 can also be regarded as part of the transformer point 310 because the busbar 308 basically forms the connection hardware of the transformer point 310. The connecting cable 306 is therefore connected to the transformer point 310.

The connecting cable 306 is designed for example for a voltage level of 20 kV in this instance, and this voltage can be transformed by means of a transformer 312 to a higher voltage, which in this instance is 110 kV, for example, and forms the voltage level of the grid section 314. The transformer 312 is accordingly connected to the grid section 314. The transformer in this instance has a primary side 316 and a secondary side 318.

As an illustration, the connecting cable 306 has a parallel line 320 shown in parallel with it as an illustration, said parallel line likewise being able to connect the grid link point 304 to the busbar 308 or the transformer point 310 when a likewise illustrative isolator switch 322 is closed. Likewise as an illustration, various loads, namely for example industrial loads 324 and nonindustrial loads 326, are indicated in the region of the connecting cable 306 or the parallel line 320, said loads each being able to be connected there. Despite the same reference sign 324 or 326 these loads may nevertheless be different.

For this feed arrangement 300 shown there is now provision for a method in which the wind farm as a representative local feed unit feeds in both real power and reactive power at the grid link point 304. The fed-in real power can then be changed in accordance with an applicable stipulation, that is to say a change to be made. By way of example it can be halved given an applicable stipulation. At the same time a change in the fed-in reactive power over time is limited. This is achieved by counteracting a voltage increase at the transformer 312, namely at the transformer point 310 and/or at the grid link point 304. This does not have to mean that a voltage increase is precluded here, but the absolute value thereof is at least reduced in comparison with a voltage increase that would be obtained without such a change in the fed-in reactive power over time.

The effect that can be achieved thereby is that unfavorable or even incorrect parameterization of $\cos(\varphi)$ feedback control or open-loop control results in voltage step changes at the transformer and/or at the grid link point being limited. Such unfavorable parameterization can occur for example on the basis of a reactive power budget, for example if a reactive power feed or effect is incorrectly assessed, or reactive power cannot be delivered as provided for.

In the case of correct, optimum or ideal parameterization, the $\cos(\varphi)$ at the grid link point would be adjusted such that the voltage would barely change in the event of a power change. If a wind farm is connected to a busbar directly, like the one on the busbar 310, a purely inductive character would ideally need to be assumed and $\cos(\varphi)$ would be parametrized to unity. Divergences from this ideal state regularly occur, however, which are allowed for here.

Figure 4:
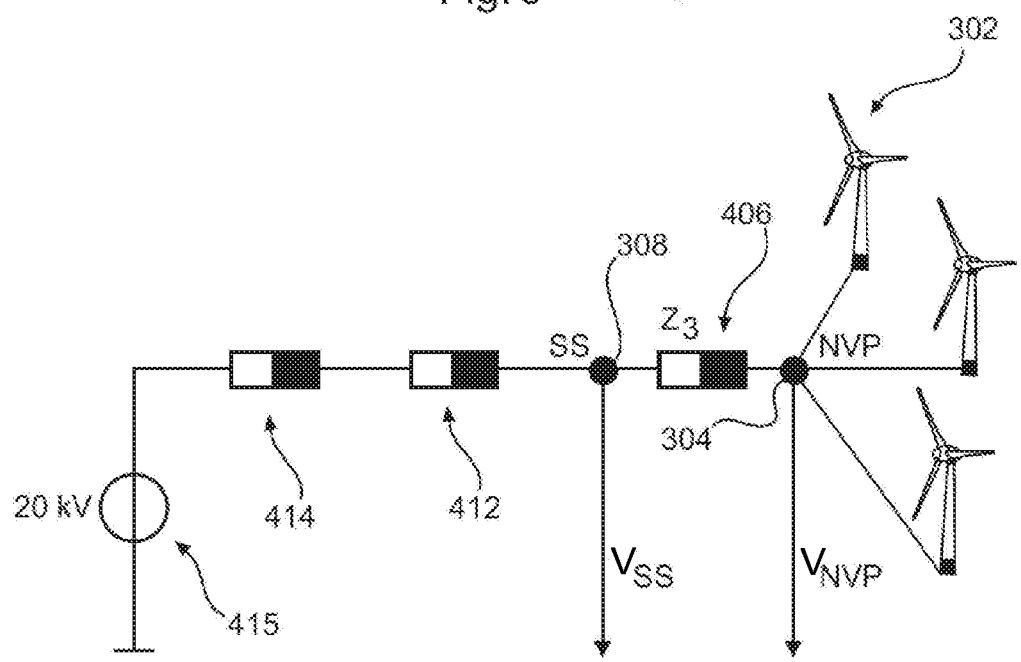
FIG. 4 shows an equivalent circuit diagram for the feed arrangement in FIG. 3.

FIG. 4 now shows an equivalent circuit diagram by way of example for the feed arrangement 300 in FIG. 3 or for a portion thereof. The equivalent circuit diagram in FIG. 4 fundamentally initially assumes that the isolator switch 322 is open as shown in FIG. 3. If it were closed, however, a quite similar equivalent circuit diagram would be obtained, but with different specific values, namely with different specific impedances or at least one different impedance.

Accordingly, FIG. 4 initially again shows the wind farm 302, which provides a feed at the grid link point 304. The connection section for the busbar 308 and hence for the transformer point 310 has a connection impedance 406. This connection impedance 406 is referred to as impedance $Z_3$. Very specific values are indicated here, to which the results of the graphs shown below also relate. These values cited and explained below are cited only by way of example, however, and may have either small or large divergences therefrom.

At any rate the exemplary connection impedance 406 has a resistive component, that is to say real component, of 5.78Ω and a reactance value, that is to say reactive component, of 4.83Ω. As already explained, the exact values do not matter, but it should be stated that the connection impedance 406 has a real component and a reactive component of identical magnitude in this case, for example. A real current and a reactive current each of identical amplitude would therefore lead to identical voltage drops across this connection impedance 406, for example.

The busbar 308 or the transformer point is followed by a transformer impedance 412 and a grid impedance 414 of a superimposed grid. The grid or the grid section 314, transformed to the primary side 316 of the transformer 312, can be regarded as a voltage source 415 having the voltage level 20 kV. Both the transformer impedance 412 and the grid impedance 414 are therefore impedances that are transformed to the low voltage side, that is to say the voltage side of the primary side 316 of the transformer 312. The transformer impedance 412 accordingly represents a transformed impedance of the transformer. The grid impedance 414 represents a transformed impedance of the grid section 314.

Exemplary values are indicated in this case too, allowance having been made for them below, but they may also end up differently. At any rate the values of the transformer impedance 412 are 0.14Ω for the resistive component and 3Ω for the component of the reactance. The grid impedance 414 has a resistive component of 0.07Ω and a reactance component of 0.4Ω. It can be seen that particularly the transformer impedance 412 has a very much higher reactance value than the value of the resistance. In this case there is a factor of 20 between the two components, for example. It can therefore be seen that a change in the reactive current through this transformer impedance 412 results in a substantially larger voltage change than a change in the real current. Accordingly, an undesirable voltage change can occur particularly, but not only, at the transformer impedance 412 if real power and reactive power fed in by the wind farm 302 are changed in equal measure.

In principle, the feeding-in of real and reactive power, which also includes the negative feeding-in of reactive power, may be selected such that—in illustrative terms—the reactive power counteracts a voltage increase as a result of the real power. This applies at any rate at the grid link point if a supply connection that dominates here, that is to say a dominating cable impedance of the supply connection, is present. If both values are now changed to the same extent, however, this can lead to a new situation at another point in which this compensation is no longer available. This has been recognized particularly as a problem for wind farms in which the grid link point is connected to a transformer, in particular a substation, directly or with a weakly dominant supply connection. This applies particularly if the grid link point is connected to the transformer directly, or is even located in the substation, and if the wind farms are under $\cos(\varphi)$ feedback control. This may be the case for example if applicable control of the reactive power budget requires this. It has been recognized that in such a case the real current does not have much of a voltage-increasing effect, but the reactive current has a voltage-lowering effect. If the reactive current is absent in such a case, the power increase results in a sudden increase in the voltage.

The graphs below illustrate various options for changing the real and reactive powers and show possible effects resulting therefrom.

Figure 5:
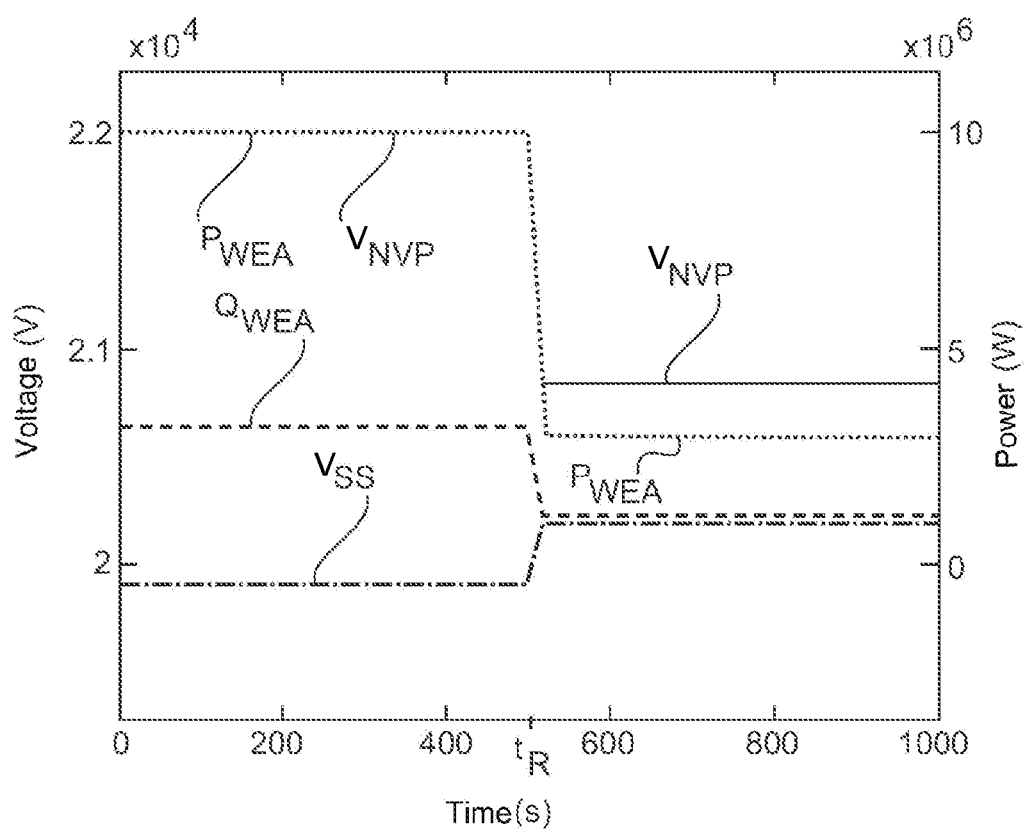
FIG. 5 shows a graph of a change in feed according to the prior art.

FIG. 5 shows a graph showing a known type of the variation.

The graph in FIG. 5 plots power and voltage characteristics over time. A stable feed situation is initially assumed in that case, until, at the time $t_R$, a reduction of real power is stipulated and then also implemented. In this respect the graph shows a fed-in farm real power $P_{WEA}$, which in that case is reduced for example at the reduction time $t_R$ from for example 10 MW to approximately 3 MW. The reduction fundamentally takes place immediately, which means that the graph in FIG. 5 approximately shows a step-like characteristic for the reduction of the real power $P_{WEA}$. On the basis of a firmly stipulated phase angle, the fed-in reactive power $Q_{WEA}$ is likewise reduced at the reduction time $t_R$, namely also fundamentally in step-like fashion. The graph then shows divergences between the real power $P_{WEA}$ and the reactive power $Q_{WEA}$, which are sometimes also related to the representation, however, and are less relevant here. At any rate the fed-in reactive power $Q_{WEA}$ is also reduced quickly together with the real power.

As a result or as related consequences, both the voltage $V_{NVP}$ at the grid link point 304 and the voltage $V_{SS}$ on the busbar 308, which in turn corresponds to the voltage at the transformer point 310, can change.

It can be seen that the reduction of the real power $P_{WEA}$ and of the reactive power $Q_{WEA}$ leads to a reduction of the voltage $U_{NVP}$ at the grid link point. This is related particularly to the fact that the connection impedance 406 has a larger resistive component in comparison with the reactive power component. A decrease in the real power therefore leads to a voltage reduction, which is counteracted by the simultaneous reduction of the reactive power. Since the reactance component of the connection impedance 406 is smaller than the resistive component, however, the simultaneous reactive power reduction cannot counteract the lowering of the voltage on account of the real power reduction completely. In the event of a phase angle being adjusted for this grid link point in optimum fashion, the voltage change at the grid link point (NVP) would be minimal, however.

The response in the case of the voltage $V_{SS}$ on the busbar is somewhat different, because particularly the transformer impedance 412 but also, albeit to a slightly lesser extent, the grid impedance or transformed grid impedance 414 each have a significantly larger reactance component in comparison with the resistive component. The voltage-increasing effect as a result of the reactive power reduction is greater in that case than the voltage-lowering effect as a result of the real power decrease. For this reason, the voltage on the busbar $V_{SS}$ rises undesirably at the reduction time $t_R$.

A particular problem in this instance is that this voltage rise accompanies the real power reduction and reactive power reduction so quickly, namely immediately, that a variable ratio transformer cannot compensate for this quickly enough. Particularly the transformer 312 may be in the form of a variable ratio transformer in this case in order to counteract a slow voltage rise at the transformer point 310.

The first countermeasure proposed in the prior art is to reduce the real power $P_{WEA}$ slowly so that the reactive power $Q_{WEA}$ is also reduced slowly. This is shown in FIG. 6.

Figure 6:
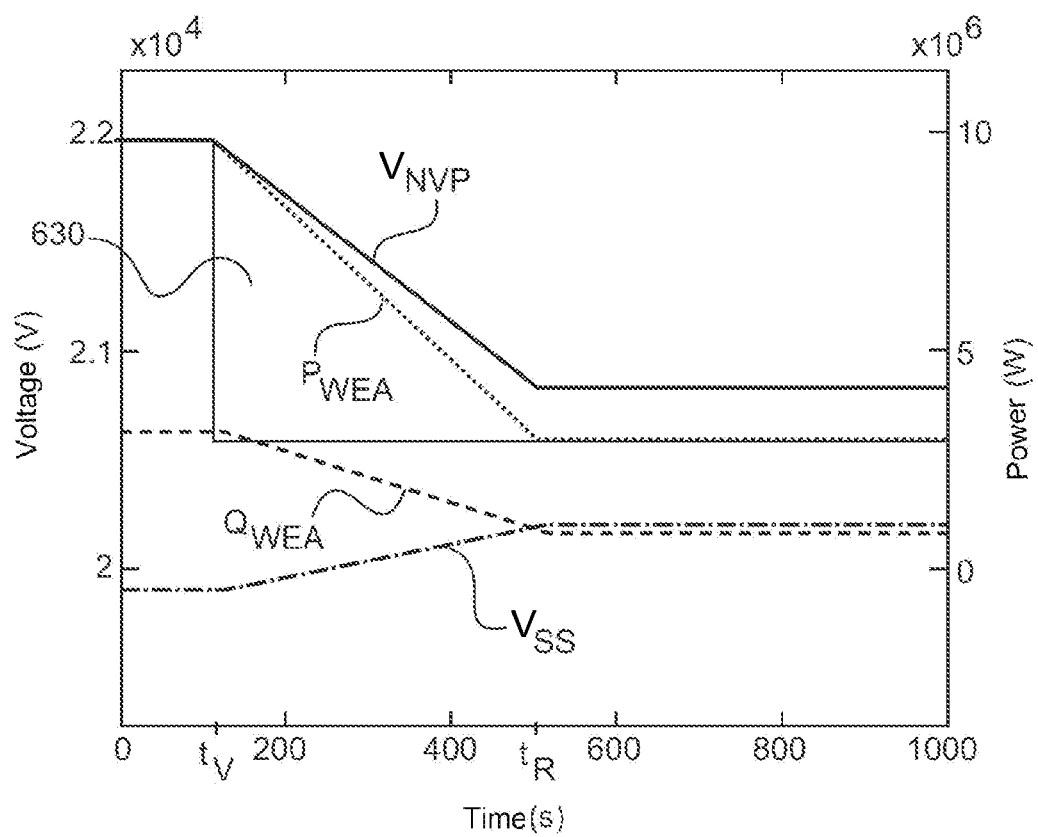
FIG. 6 shows a further graph of a change in feed.

The graph in FIG. 6, however, reveals that to reach a target value for the real power $P_{WEA}$ that is to be reduced, said real power needing to be reached at the reduction time $t_R$, the reduction needs to start earlier. For this, the reduction of the real power is already started at the lead time $t_V$. In fact, the effect achieved thereby is that the voltage at the grid link point $V_{NVP}$ and the voltage on the busbar also change correspondingly slowly. In this case there is provision for a period of 400 seconds from the lead time $t_V$ to the reduction time $t_R$. The changes shown for the voltage, particularly the change shown for the voltage on the busbar $V_{SS}$, is then sufficiently slow for a variable ratio transformer to be able to compensate for this voltage change. However, this is achieved with an excessively early power reduction, which, given the 400 seconds cited by way of example, starts 6.5 minutes too early and hence leads to losses. These losses can be illustrated by the indicated energy triangle 630.

Figure 7:
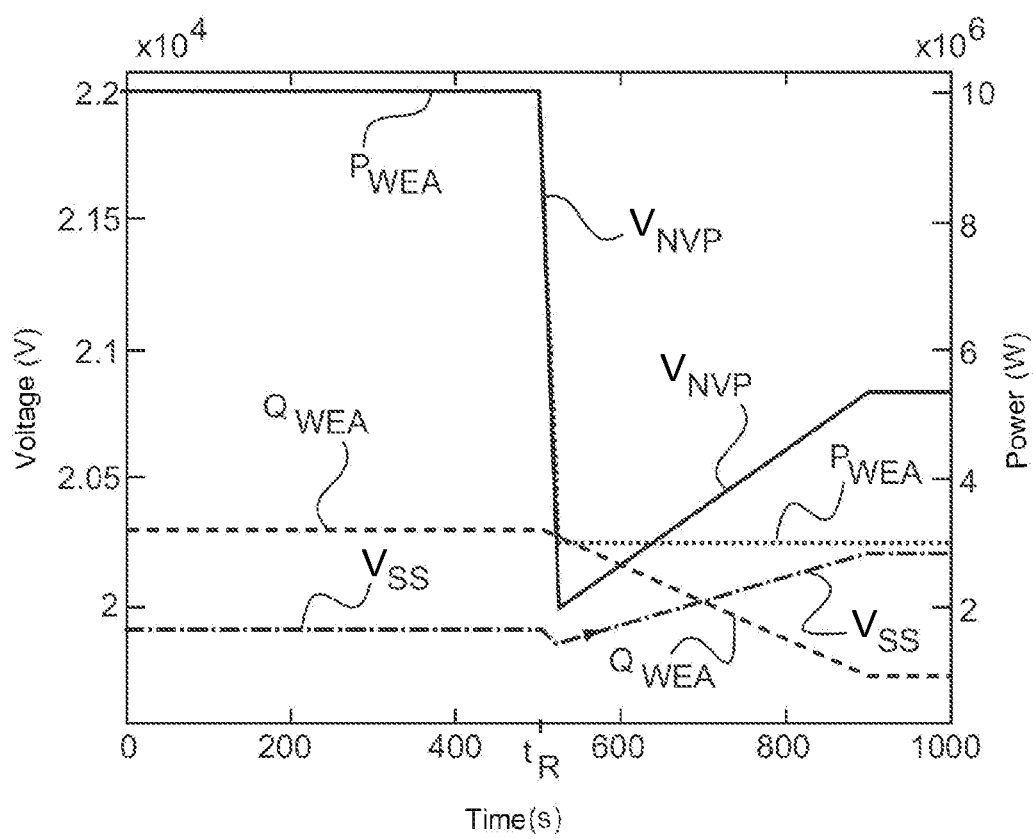
FIG. 7 shows a graph of a change in feed according to a proposed embodiment.

To avoid this, a slow reduction of the reactive power is proposed according to one embodiment, as illustrated by FIG. 7.

According to this embodiment, which is illustrated in the graph in FIG. 7, it is therefore proposed that at the reduction time $t_R$ the real power $P_{WEA}$ fed in by the wind farm be reduced in step-like fashion again, whereas the fed-in reactive power $Q_{WEA}$ is initially kept constant. This leads to a larger inductive $\cos(\varphi)$ being obtained. The voltage at the grid link point $V_{NVP}$ therefore dips sharply at the grid link point 304.

At any rate the voltage $V_{SS}$ on the busbar 308 dips only a little, however, since the configuration of the transformer impedance 412 and transformed grid impedance 414 means that said voltage has only little dependency on the real power and therefore undergoes only a very small dip as a result of the step-like reduction of the fed-in real power $P_{WEA}$.

The fed-in reactive power $Q_{WEA}$ is then lowered according to a ramp or linear function from the reduction time $t_R$ onward, however. Both the voltage $V_{NVP}$ at the grid link point 304 and the voltage $V_{SS}$ on the busbar 308 therefore increase gradually.

The sharp dip in the voltage $V_{NVP}$ at the grid link point 304 is acceptable and can be increased again as a result of the gradual change in the reactive power $Q_{WEA}$ from the reduction time $t_R$ onward. The characteristic of said voltage is not a particular problem for the electrical supply grid, particularly the grid section 314. The increase in the voltage $V_{SS}$ on the busbar 308, however, is so slow that a variable ratio transformer can compensate for this change. The result of this is only a slight effect on the electrical supply grid; in particular, the voltage at the transformer point 310 can be kept substantially constant.

In this case too, the gradual change in the reactive power fundamentally achieves a gradual change in the voltage $V_{SS}$ on the busbar that can be compensated for by a variable ratio transformer. However, the solution proposed here manages to nevertheless have the real power initially reduced in step-like fashion at the reduction time $t_R$, with no loss of yield therefore. In this instance, it has particularly also been recognized that the voltage reactions at the grid link point 304, on the one hand, and a busbar 308, on the other hand, to real power changes and reactive power changes are different. Particularly if the grid link point is connected to the busbar directly and the wind farm uses cos(q) feedback control or is under such, advantages arise for the cited method. Specific allowance has been made for this and therefore in particular a solution that avoids an abrupt large voltage step change on the busbar and then avoids a corresponding voltage step change on the secondary side 316 of the transformer 312 has been proposed. As the grid voltage can be regarded as approximately constant, undesirable voltage differences between the primary and secondary sides of the transformer are avoided.

Figure 8:
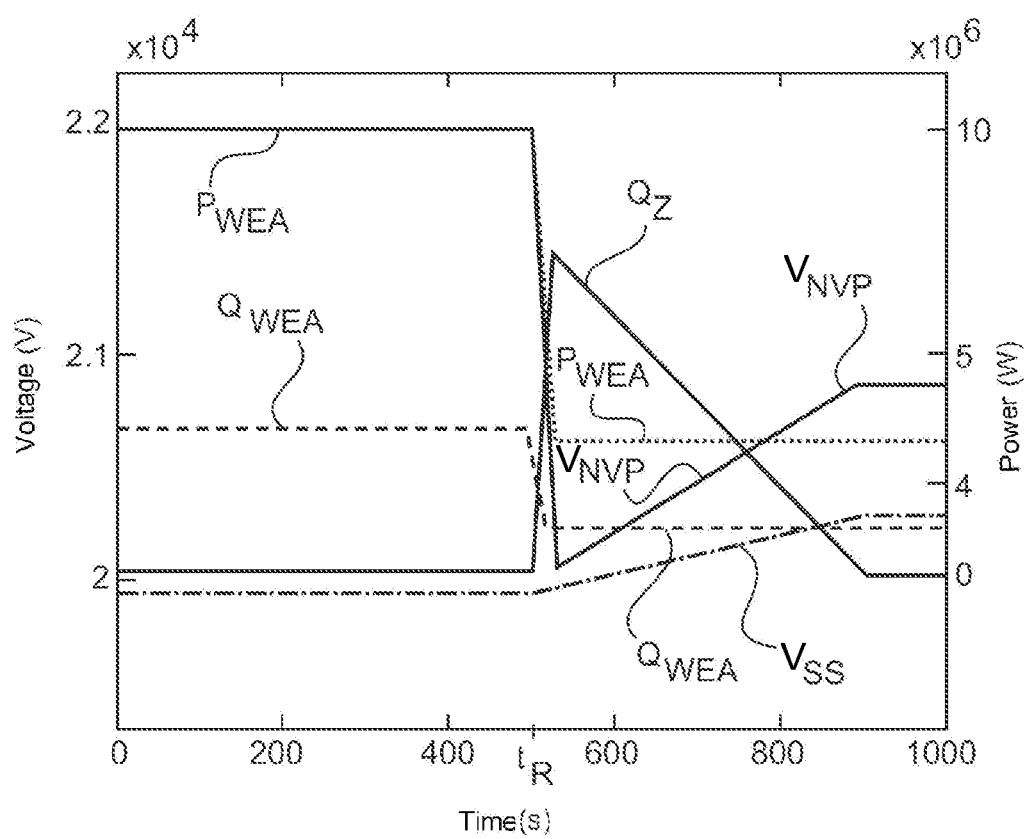
FIG. 8 shows a graph of a change in feed according to a further embodiment.

FIG. 8 shows a variant that is similar to the variant in FIG. 7. In this case too the real power $P_{WEA}$ is reduced at the reduction time $t_R$. The reactive power $Q_{WEA}$ is likewise reduced at the reduction time $t_R$ in this case, however. As a result, the voltage $V_{SS}$ on the busbar could likewise increase suddenly, as was the case according to the variant in FIG. 5. In this instance, however, additional reactive power control is now performed, particularly by an additional apparatus. This allows additional reactive power to be fed in or provided, which is referred to as $Q_Z$ in this case. This additional reactive power $Q_Z$ allows this voltage step change in the voltage $V_{SS}$ on the busbar to be counteracted.

In particular, additional reactive power control that feeds in precisely enough reactive power, and in an appropriate manner, for the voltage $V_{SS}$ on the busbar not to rise as a result of the fall in the real power $P_{WEA}$ and in particular as a result of the parallel drop in the reactive power $Q_{WEA}$ is performed in this case. This additional reactive power control thus counteracts this. The additional reactive power control can provide for the additional reactive power $Q_Z$ to be reduced gradually again after the reduction time $t_R$, particularly with a falling ramp, or to be reduced correspondingly linearly. This then leads to a slow increase in the voltage $V_{SS}$ on the busbar, which occurs so slowly, however, that a variable ratio transformer can counteract it. The voltage on the primary side 316 of the transformer 312 can therefore be maintained. This allows the additional reactive power control then to be returned to a value of 0, which means that no additional reactive power is then fed in.

The additional reactive power in the reactive power control can fundamentally also be provided by the inverters of the wind power installations. The control value can be added to a reactive power value of a phase angle control loop. The setpoint value can be stipulated, e.g., by a central farm control system, which can also be referred to as an FCU, or a remote control terminal, which is also referred to as an RTU, whereas the phase angle is adjusted by a closed-loop or open-loop control system of a wind power installation.

Further variants proposed are that the control element used for generating additional reactive power is another wind power installation or another wind farm, a STATCOM or other compensating mechanisms.

A disadvantage in this context may particularly be that such additional reactive power control is sophisticated.

In the case of wind farms that are not connected to the busbar directly, it can be a conflict of interests if these voltage changes need to be limited both at the grid link point and on the busbar.

In this case it may be critical if the wind farm uses stipulation of a cos(q) reactive power for feedback control. Control of the reactive power can also be referred to as control of the reactive power budget of the wind farm. A particularly critical case is when the reactive power control, particularly the stipulated power factor, that is to say cos($\varphi$), does not or does not sufficiently accurately match the system in this case. Allowance can also be made for a reactive power budget in this instance, for example if a grid operator stipulates a reactive power budget.

Figure 9:
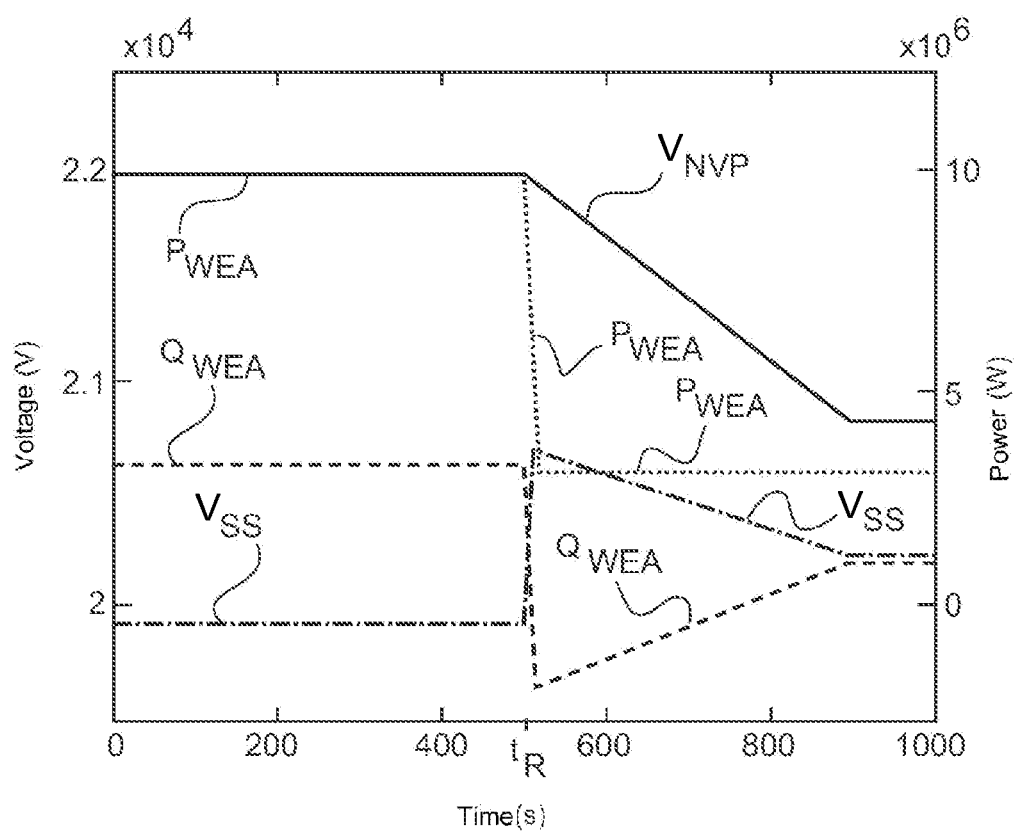
FIG. 9 shows a graph of a change in feed according to a further embodiment still.

In FIG. 9 the voltage at the grid link point (NVP) is controlled temporarily. This indirectly results in a cos($\varphi$) that matches the grid link point, which can also be referred to as a correct cos($\varphi$).

This can have significant effects on the voltage on the busbar in the case of the exemplary topology shown in FIG. 3.

If the farm, unlike in the exemplary topology in FIG. 3, is connected to the busbar directly, the method proposed according to FIG. 9 leads to particular advantages.

FIG. 9 shows a variant in which feedback control is used that controls the voltage $V_{NVP}$ at the grid link point 304. In this regard, it is assumed here too that the fed-in real power $P_{WEA}$ is reduced suddenly at the reduction time $t_R$. However, there is then provision for feedback control that initially maintains the voltage $V_{NVP}$ at the grid link point. This is accomplished by lowering the fed-in reactive power $Q_{WEA}$ at the reduction time $t_R$ accordingly. The cos($\varphi$) changes as a result. In order to get the cos($\varphi$) to the earlier value again, the reactive power is then slowly raised, in particular linearly, to a setpoint value that corresponds to the initial cos($\varphi$) stipulation, or which then produces the cos($\varphi$), shortly after the reduction time $t_R$.

As a result of this measure, the voltage $V_{NVP}$ at the grid link point is initially maintained, but then lowered, likewise for example in ramp-like fashion, that is to say particularly linearly, to a later value, which the voltage $V_{NVP}$ at the grid link point then maintains, specifically as soon as the previous cos($\varphi$) has been reached again. A new setpoint value for the cos($\varphi$) could naturally also be stipulated in this case if desirable for other reasons.

At the same time, however, the voltage $V_{SS}$ on the busbar undergoes a step change at the reduction time $t_R$ as a result of this measure. It too is then reduced again accordingly as a result of the gradual linear change in the fed-in reactive power $Q_{WEA}$, however.

According to one variant, it is proposed that both step changes, that is to say the step change in the voltage $V_{SS}$ on the busbar and the reactive power step change, be limited to a stipulated amount. In this regard, a small reactive power step change can be permitted in order to subsequently reduce the reactive power by means of a ramp. The effect that can be achieved thereby is that, instead of a large step change in the voltage $V_{SS}$ on the busbar, only a small step change occurs there, while a small voltage step change is additionally accepted at the grid link point. The voltage therefore changes in different directions at these two points, but the change is split over two small changes.

It should be borne in mind, however, that the connection impedance 406 may also be in a totally different form. As an alternative to the topology illustrated in FIG. 3, the grid link point could also be connected to the busbar without or without significant impedance, that is to say for example without or only with a negligibly long connecting cable. In that case, the voltage $V_{SS}$ on the busbar would accordingly behave like the voltage $V_{NVP}$ at the grid link point, since the grid link point and the busbar would be electrically connected in identical, or at least almost identical, fashion. The voltage $V_{SS}$ on the busbar would then accordingly likewise not change suddenly, but rather only gradually, as also shown for the voltage $V_{NVP}$ at the grid link point in FIG. 9. A variable ratio transformer could accordingly counteract this gradual voltage drop.

In this respect, however, FIG. 9 illustrates that such control for maintaining the voltage $V_{NVP}$ at the grid link point is not always advisable, but rather is dependent on the specific situation, namely also on the transmission response from the grid link point to the busbar.

The invention claimed is:

1. A method for feeding electric power into an electrical supply grid using a feed unit, comprising:
feeding electrical real power into the electrical supply grid at a grid link point, wherein the feed unit is connected to the grid link point for feeding electric power, the grid link point is connected to a transformer point directly or via a supply connection, and wherein the transformer point is connected to a grid section via a transformer for transmitting the electric power from the transformer point to the grid section via the transformer;
feeding electrical reactive power into the electrical supply grid at the grid link point;
detecting a change to be made in the real power to be fed in;
changing the fed-in real power in accordance with the detected change to be made; and
at least one of:
limiting a change in the fed-in reactive power over time in response to changing the fed-in real power to counteract a voltage increase at the transformer point or in the grid section; or
temporarily activating voltage control based on the change in the fed-in real power, in order to:
perform the voltage control at a reference point in response to the change in the fed-in real power, and
dynamically correct a voltage at the reference point or grid link point, or bring the voltage at the reference point or grid link point along a trajectory,
wherein a power factor control for the feeding-in of electrical reactive power is provisioned, and the power factor control causes the fed-in reactive power to be adjusted based on the fed-in real power such that a stipulated power factor is obtained, and
wherein the changing the fed-in real power includes:
initially changing the fed-in reactive power concurrently such that the power factor remains unchanged;
setting a new value for the power factor based on a voltage that changes as a result of the change in the real power and reactive power or a changed voltage that is to be expected at the grid link point; and
reducing the power factor to the set power factor again, wherein the reduction is made with a delay or using a time function.

2. The method as claimed in claim 1, wherein the change in the fed-in reactive power over time is limited such that:
the fed-in reactive power is changed in accordance with a change function having a ramp with a slope of limited absolute value, or
a gradient limit value is set for the fed-in reactive power, the gradient limit value being a maximum change in an absolute value of the fed-in reactive power over time such that the fed-in reactive power is changed with a temporal gradient having an absolute value that does not exceed the gradient limit value.

3. The method as claimed in claim 1, wherein:
the transformer has a primary side to which the transformer point is connected and a secondary side to which the grid section is connected,
the transformer is a variable ratio transformer and is configured to adjust a transformation ratio of the primary side to the secondary side to control a voltage level at the transformer point or on the grid section, and
the change in the fed-in reactive power over time is limited such that a voltage change at the transformer point or on the primary side resulting from the change in the fed-in reactive power is sufficiently slow to allow the variable ratio transformer to correct a resultant voltage change.

4. The method as claimed in claim 1, wherein limiting a change over time for the fed-in real power is not provisioned.

5. The method as claimed in claim 1, wherein the temporarily activated voltage control is active only during the change in the fed-in real power or substantially immediately thereafter and reduces the voltage at the grid link point from a value that is changed by the change in the fed-in real power wholly or partially to a value that the voltage at the grid link point had immediately before the change in the fed-in real power.

6. The method as claimed in claim 5, wherein the temporarily activated voltage control is performed when the grid link point is connected to the transformer point directly.

7. The method as claimed in claim 1, wherein:
power factor control for the feeding-in of electrical reactive power is provided, and the power factor control causes the fed-in reactive power to be adjusted based on the fed-in real power such that a stipulated power factor is obtained,
the change in the fed-in real power includes changing the fed-in real power along a ramp or trajectory,
the change in the fed-in real power along the ramp or trajectory includes using the voltage control to keep the voltage at the reference point constant at least to counteract a voltage change as a result of the change in the fed-in real power, wherein the voltage control adjusts the reactive power, and the power factor control is deactivated during the voltage control,
the change in the fed-in real power is followed by a reactive power value that results from the voltage control being taken to a new reactive power value that would be obtained as a result of the deactivated power factor control,
the reactive power value is taken to the new reactive power value via a ramp or trajectory, and the deactivated power factor control is activated in response to the reactive power value reaching the new reactive power value.

8. The method as claimed in claim 1, wherein the fed-in real power is changed using a real power step change, and the reactive power is changed using a time function.

9. The method as claimed in claim 8, wherein the time function is a ramp function.

10. The method as claimed in claim 1, wherein the limiting of the change in the fed-in reactive power over time is dependent on the type or size of the supply connection.

11. The method as claimed in claim 1, wherein the feed unit is at least one wind power installation.

12. The method as claimed in claim 1, wherein the supply connection is configured for transmitting the electric power from the grid link point to the transformer point via the supply connection.

13. The method as claimed in claim 1, wherein the reference point is the grid link point.

14. The method as claimed in claim 1, wherein bringing the voltage at the reference point or the grid link point along the trajectory includes bringing the voltage at the reference point or the grid link point along a ramp.

15. A wind power installation for feeding electric power into an electrical supply grid, comprising:
an inverter for feeding electrical real power into the electrical supply grid at a grid link point, wherein the wind power installation is connected to the grid link point for feeding in electric power, the grid link point is connected to a transformer point directly or via a supply connection for the purpose of transmitting the electric power from the grid link point to the transformer point via the supply connection, and the transformer point is connected to a grid section via the transformer for transmitting the electric power from the transformer point to the grid section via the transformer;
an inverter controller for controlling a feed of electrical reactive power into the electrical supply grid at the grid link point; and
an input interface for detecting a change to be made in the real power to be fed in, wherein
the inverter controller is configured to change the fed-in real power in accordance with the detected change to be made, and
at least one of:
the inverter controller is configured to control or limit a change in the fed-in reactive power over time in response to changing the fed-in real power to counteract a voltage increase at at least one of: the transformer point or the grid section, or
the inverter controller is configured to temporarily activate voltage control based on the change in the fed-in real power to perform voltage control at a reference point in response to the change in the fed-in real power, and dynamically correct the voltage at the reference point or grid link point or to bring the voltage at the reference point or grid link point along a trajectory,
wherein controlling or limiting the change in the fed-in reactive power over time includes:
initially changing the fed-in reactive power concurrently such that the power factor remains unchanged;
setting a new value for the power factor based on a voltage that changes as a result of the change in the real power and reactive power or a changed voltage that is to be expected at the grid link point; and
reducing the power factor to the set power factor again, wherein the reduction is made with a delay or using a time function.

16. A wind farm, comprising:
a plurality of wind power installations, wherein at least one of the plurality of wind power installations is the wind power installation as claimed in claim 15.

17. A feed arrangement for feeding electric power into an electrical supply grid, comprising:
a local feed unit;
a grid link point;
a transformer having a transformer point, wherein:
the local feed unit is connected to the grid link point for feeding in the electric power,
the grid link point is connected to the transformer point directly or via a supply connection for transmitting the electric power from the grid link point to the transformer point via the supply connection, and
the transformer point is connected to a grid section via the transformer for transmitting the electric power from the transformer point to the grid section via the transformer
an inverter for feeding electrical real power into the electrical supply grid at the grid link point;
an inverter controller for controlling a feed of electrical reactive power into the electrical supply grid at the grid link point;
an input interface for detecting a change to be made in the real power to be fed in, wherein:
the inverter controller is configured to change the fed-in real power in accordance with the detected change to be made, and wherein at least one of:
the inverter controller is configured to limit a change in the fed-in reactive power over time in response to changing the fed-in real power to counteract a voltage increase at at least one of: the transformer point or the grid section, or
the inverter controller is configured to temporarily activate voltage control based on the change in the fed-in real power to perform the voltage control at a reference point in response to the change in the fed-in real power and dynamically correct the voltage at the reference point or grid link point or bring the voltage at the reference point or grid link point along a trajectory,
wherein limiting the change in the fed-in reactive power over time includes:
initially changing the fed-in reactive power concurrently such that the power factor remains unchanged;
setting a new value for the power factor based on a voltage that changes as a result of the change in the real power and reactive power or a changed voltage that is to be expected at the grid link point; and
reducing the power factor to the set power factor again, wherein the reduction is made with a delay or using a time function.

18. The feed arrangement as claimed in claim 17, wherein the local feed unit is a wind power installation.

* * * * *